Dec. 9, 1930.   W. F. SEARLE, JR   1,784,077
THERMOSTATICALLY CONTROLLED VALVE MECHANISM
Filed Aug. 1, 1927   2 Sheets-Sheet 1
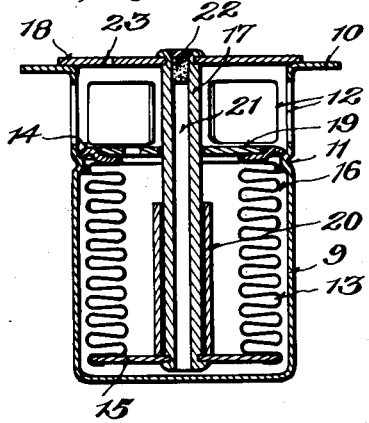
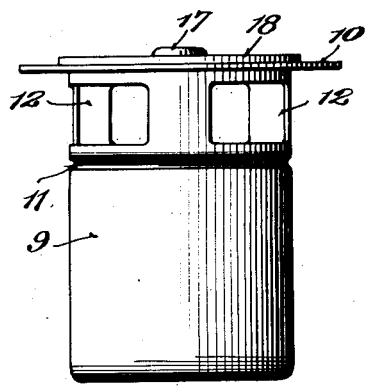
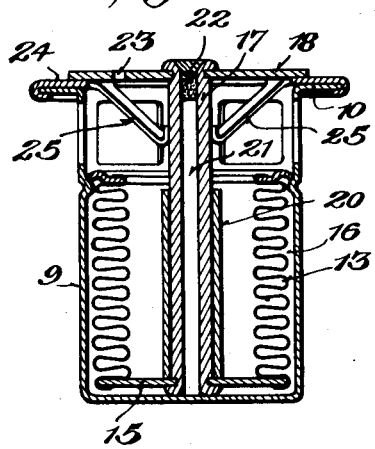
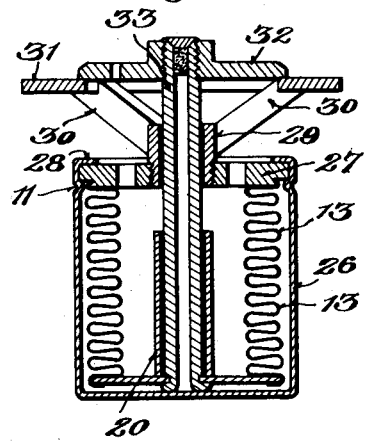
Inventor
William F. Searle, Jr.
By Cameron, Kerkam + Sutton
Attorneys Dec. 9, 1930.   W. F. SEARLE, JR   1,784,077
THERMOSTATICALLY CONTROLLED VALVE MECHANISM
Filed Aug. 1, 1927   2 Sheets-Sheet 2

Inventor
William F Searle Jr.
By Cameron Kerkam + Sutton
Attorneys

Patented Dec. 9, 1930

1,784,077

UNITED STATES PATENT OFFICE

WILLIAM F. SEARLE, JR., OF KNOXVILLE, TENNESSEE, ASSIGNOR TO THE FULTON SYLPHON COMPANY, OF KNOXVILLE, TENNESSEE, A CORPORATION OF DELAWARE

THERMOSTATICALLY-CONTROLLED VALVE MECHANISM

Application filed August 1, 1927. Serial No. 209,981.

This invention relates to valve mechanism, and more particularly to thermostatically controlled valve mechanism for regulating the flow of cooling medium in the cooling system of an internal combustion engine whereby the temperature of the latter may be controlled.

One of the objects of this invention is to provide novel thermostatically controlled valve mechanism of the type employing an expansible and collapsible, corrugated wall wherein the fixed end of the corrugated wall is located intermediate the valve seat and the movable end of the corrugated wall.

Another object of this invention is to provide novel thermostatically controlled valve mechanism of the choker type wherein the opening or passage between the valve seat and the adjacent end of the thermostat remains invariable regardless of the expansion and contraction of said thermostat.

Another object of this invention is to provide novel thermostatically controlled valve mechanism of the cup type adapted for use as a regulator of the choker type.

Another object of this invention is to provide thermostatically controlled valve mechanism employing a thermostat of the cup type wherein a portion of the cup constitutes the valve seat.

Another object of this invention is to provide novel thermostatically controlled valve mechanism employing a thermostat of the cup type wherein the corrugated wall is not subjected to the direct flow of the cooling medium.

Another object of this invention is to provide a device of the character described embodying novel means for limiting and guiding the expansion and contraction of the thermostat and the movement of the valve, and which is simple and compact in structure, inexpensive to manufacture, and readily applicable to cooling systems of the automobile type, for example, without special design of the parts to which it is applied. The above and other objects will appear more fully hereinafter in the detail description of the invention.

The invention is capable of receiving a number of mechanical expressions, some of which are shown in the accompanying drawings, but it is to be expressly understood that the drawings are for purposes of illustration only and are not designed as a definition of the limits of the invention, reference being had to the appended claims for this purpose.

In the drawings, wherein like reference characters refer to like parts throughout the several views,—

Fig. 1 is an axial section of a thermostatically controlled valve mechanism embodying the present invention;

Fig. 2 is a side elevation of the structure shown in Fig. 1;

Figs. 3 and 4 are axial sections of other embodiments of the present invention;

Figure 5:
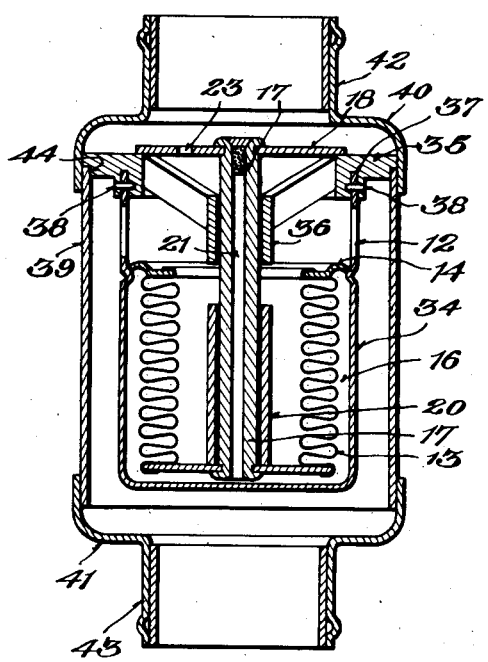
Fig. 5 is an axial section of another embodiment of the present invention, assembled with a housing adapted to be installed in a system the cooling medium of which is to be controlled, and representing one of a variety of suitable mountings for the several illustrated embodiments of the invention.

In the form shown in Figs. 1 and 2, the thermostatically controlled valve mechanism comprises an outer casing 9 which preferably has the form of a cylindrical cup, and which has its open end bent outwardly as at 10 to form an annular flange adapted to constitute a valve seat. An inwardly bent groove 11, which may be formed by rolling, is shown in the wall of casing 9 to facilitate the location and attachment of the fixed end of the flexible wall as hereinafter explained, and intermediate said groove and the flange 10 are a plurality of openings 12, which may be punched in the wall, through which the cooling medium is adapted to flow when the valve, to be described hereafter, is open or unseated.

Mounted within, and attached to, the cup-shaped casing 9 is a deeply corrugated, flexible tubular wall 13 that is preferably formed of metal. Various means may be employed for attaching the corrugated wall or "bellows" 13 to the casing 9. As shown, an annular member or head 14 is suitably secured, as by means of soldering or brazing, to the outer end of bellows 13, and said member is engaged with the projection formed in the inner face of the wall of casing 9 by the groove 11 and suitably secured thereto, as by soldering. Integral with or suitably attached, as by means of soldering or brazing, to the inner end of the corrugated wall 13 is a disk 15 which constitutes the movable end wall or head of the bellows 13, member 14 constituting the fixed end wall thereof. A confined space 16 is thus formed between the cup 9 and corrugated member 13, which space is designed to receive a volatile or thermo-sensitive fluid that is preferably introduced therein at a pressure less than atmospheric as will be subsequently pointed out.

Centrally formed on or secured to the disk 15 in any suitable way, as by riveting and soldering, is a stem 17, that may be of tubular form, which extends outwardly beyond the flanged end 10 of the cup 9, and on the outer end of said stem is mounted a disk valve 18 which may be retained in position on said stem in any suitable way, as by riveting and soldering. It will be understood that disk 15, with stem 16 attached thereto, is secured to flexible wall 13 before the latter is inserted in cup 10.

Suitable means are provided for guiding valve 18 and limiting its movement away from the valve seat constituted by flange 10. In the form illustrated, a member 19, which may have the form of a perforated disk, is secured in any suitable manner to the outer face of the annular head 14, and is provided with a central aperture through which the valve stem 17 extends slidably. Member 19 guides said valve stem and is adapted to coact with a stop of any suitable character movable with said stem and shown as a sleeve 20 surrounding the stem and secured thereto or to the disk 15 to limit the expansion of the corrugated, flexible wall 13 and the movement of the valve away from its seat. It will be understood that sleeve 20 may be integral with valve stem 17, i. e., it may constitute an enlargement of said stem, as shown in some of the embodiments to be described.

The valve stem 17 is preferably utilized as a filling tube, and is shown as provided with a passage 21 therethrough, the latter being sealed at its outer end, as by means of cork and solder 22, after the thermosensitive fluid has been introduced into cup 9. A leakage hole 23 of desired size may be provided in valve 18.

Normally, valve 18 is retained on seat 10 by the resiliency of corrugated member 13. Expansion of the thermosensitive fluid in the space 16, due to an increase in the temperature of the cooling medium, causes end wall 15, valve stem 17, and valve 18 to move upwardly, as viewed in Fig. 1, accompanied by a contraction of the flexible wall 13, valve 18 thereby being moved away from the seat 10. During this movement valve stem 17 is guided by disk 19 and said movement is positively limited by the engagement of the sleeve 20 with said disk, which thus constitutes a positive stop. The openings 12 are not restricted by this movement of the parts and the flow of the cooling medium is thus controlled solely by the position of valve 18. Since the corrugated wall 13 is not directly exposed to the flow of the cooling medium, the likelihood of said wall becoming encrusted with dirt, or other impurities in the cooling medium, is reduced, and hence the life of the wall is increased as well as its efficiency.

In the form shown in Figure 3, the flange 10 of the casing 9 has fixedly attached thereto a valve seat 24 constituted by an annular member which is curled over at its periphery to engage the under face of the periphery of said flange. Formed integrally with member 24 and extending radially inward, and also preferably axially inward, are a plurality of arms 25, the inner ends of which are shown as bent outwardly and having sliding engagement with the stem 17 to constitute a guide, and also to serve as a stop adapted to coact with the sleeve 20. Preferably, three arms 25 are provided although any other suitable number may be provided if desired. Member 24 and its arms 25 may be conveniently struck up from sheet metal. The remaining elements are similar to those shown in Figs. 1 and 2. By the provision of valve seat 24 it is obvious that the opening in said seat may be made of desired diameter, and the size of the valve employed may be correspondingly varied without the necessity of varying the diameter of the cup-shaped casing 9. Arms 25 render the use of the guiding and stop member 19 unnecessary.

In the form shown in Fig. 4, a cup 26 has mounted therein the deeply corrugated, flexible wall 13, the outer end of said wall being secured to a disk 27, preferably perforated, which is fixedly attached to the outer end of the cup, a groove 11 being formed therein if desired to facilitate the location and attachment of said disk. The upper end of cup 26 is also shown as bent over at 28 to engage the upper surface of said disk.

Threaded into the central portion of disk 27 is a member, which may be a casting, comprising a center guide 29 having upwardly and outwardly extending arms 30 which support and may be integral with an annular flange 31 constituting a valve seat for a valve 32 which is suitably attached to the valve stem 33, being shown as threaded thereon. Relative rotation between the center guide 29 and the disk 27 may be prevented by means of solder. As in the embodiment of the invention illustrated in Fig. 3, the valve seat and the valve employed may be of less diameter than the cup 26. Moreover, cup 26 is much shorter than that required in the embodiments of the invention illustrated in Figs. 1 and 3, and there is no necessity for providing openings in the wall of the cup to permit the circulation of the cooling medium. Any suitable number of arms 30 may be employed for supporting the valve seat 31 but in the form shown only three are employed. Sleeve 20 is adapted to engage the inner face of disk 27 to limit the expansion of the flexible wall 13. As in the previously described embodiments, the contraction of the flexible wall does not vary the size of the passage through which the cooling medium is adapted to flow.

In the form shown in Fig. 5, a casing 34, constituting the cup, has secured to its open end a member 35 which constitutes a valve seat for the valve 18. As in Fig. 4, said member is provided with inwardly extending arms 30 which terminate in an integrally formed center guide 36 through which slidably extends the valve stem 17.

Any suitable means may be employed for securing the valve seat member to the upper end of wall 34. In the form shown, member 35 is provided on its inner face with an annular groove 37 into which the open end of casing 34 extends, and pins 38 are passed through suitable openings in the member 35 and the wall of member 34 to hold the parts in assembled position, after which they may be soldered in place, if desired. No stop disk is required in this embodiment since sleeve 20 is adapted to engage the inner end of center guide 36 to positively limit the expansion of the flexible wall 13.

Fig. 5 also illustrates one manner in which the thermostatically operated valve mechanism of the present invention may be mounted. As here shown, said mechanism is mounted within a tubular housing 39 which is closed at its opposite ends by flanged end members 40, 41 provided with nipples 42 and 43 respectively, for the attachment thereto of suitable hose connections. The valve seat constituted by member 35 is here shown as having a cut away portion 44 of such size as to fit into the tubular housing 39, said member having an outer diameter of such size as to fit within the end member 40. After the parts are assembled, members 40 and 41 may be soldered or otherwise suitably attached to the housing 39.

Figure 6:
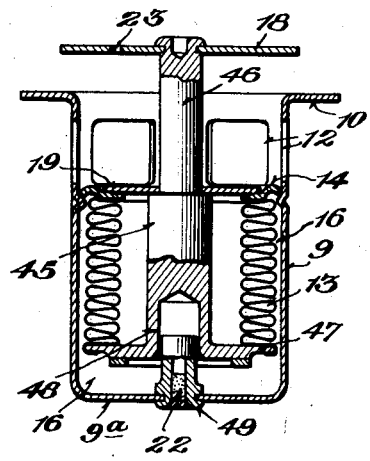
Figs. 6 and 7 are axial sections of still other embodiments of the invention.

In the form shown in Fig. 6, the valve seat is provided by flanging the open end of the cylindrical cup 9 in a manner similar to that shown in Fig. 1. In this embodiment the valve stem and the movable end wall of the bellows or flexible wall 13 are formed integrally, the valve stem comprising an enlarged portion 45 and a reduced portion 46. The movable end wall of the bellows is thereby constituted by a flange 47 integral with the inner end of the enlarged portion 45 of the valve stem. The portion 45 forms a shoulder which is adapted to engage the stop and guiding disk 19 fixedly attached to annular head 14, as in the embodiment shown in Fig. 1, whereby expansion of the flexible wall is positively limited. The lower end of the valve stem is provided with a recess 48 to receive a tube 49 that passes through and is suitably secured to the end wall 9a of casing 9. Tube 49 may have sliding engagement with the wall of recess 48 to aid in guiding the stem 45, 46 in its longitudinal movement. Tube 49 is preferably used as a filling tube for introducing the thermosensitive fluid into space 16, said tube being suitably sealed as by means of cork and solder 22.

Figure 7:
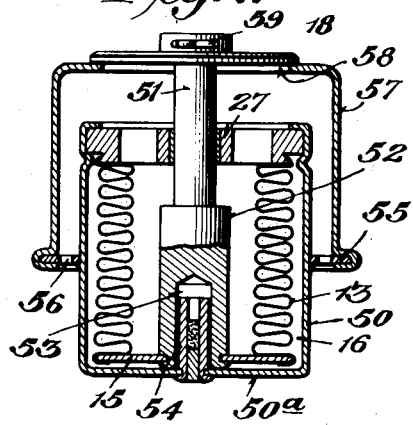
Figure 8:
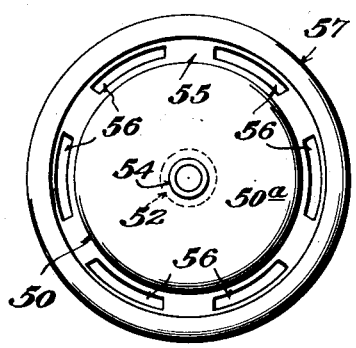
Fig. 8 is an end elevation of the embodiment shown in Fig. 7.

The embodiment of the invention shown in Figs. 7 and 8 comprises a cup 50 in which is mounted the flexible corrugated member 13, said member being fixedly attached, as by means of solder, to a perforated disk 27 in a manner similar to that described in connection with Fig. 4. The movable end wall 15 of the corrugated member 13 has fixedly attached thereto a valve stem comprising an outer reduced portion 51 and an inner enlarged portion 52, the latter being secured to wall 15 as by riveting and soldering. The reduced portion 51 of the valve stem passes through a central opening in disk 27, whereby the stem is guided in its longitudinal movement, and the enlarged portion 52 of the stem is adapted to engage the inner face of disk 27 to limit the contraction of the flexible member 13. Preferably the inner end of enlarged portion 52 is provided with a longitudinally extending recess 53 into which extends a filling plug 54 that is secured to the closed end wall 50a of cup 50. The filling plug 54 may also coact with valve stem 51, 52 to aid in guiding said stem.

Surrounding cup 50, intermediate the ends thereof, is an annular disk 55 provided with a plurality of elongated openings 56. Disk 55 is preferably secured to the outer face of the wall of cup 50, as by means of solder, and extends in a plane substantially parallel to perforated disk 27 and end wall 15. The disk 55 constitutes a support for a cup 57, the open end of the latter being bent around and fixedly secured to the periphery of the disk, as by means of solder. Cup 57 is of such diameter that an annular space is provided around the outer surface of cup 50, and the outer end of the former is positioned a suitable distance in advance of the outer face of perforated disk 27. A circular opening 58 is provided in the central portion of the outer end of cup 57 and said opening is normally closed by valve 18 carried on the outer end of valve stem 51, 52, the valve being retained in position on said stem in any suitable way, as by means of a cotter pin 59. Cup 57, which is thus telescopically associated with cup 50, constitutes the seat for valve 18 and the cooling medium circulates through the openings 56 in the annular disk 55, through the annular space provided intermediate cups 50 and 57, and through the opening 58 when valve 18 is off its seat. This embodiment enables the valve port to be made of any desired size, larger than as well as smaller than the cup.

It will therefore be seen that there is provided thermostatically controlled valve mechanism wherein the cooling medium comes in contact with the casing, constituted by a cup-shaped member, rather than in contact with the flexible bellows. The latter is subject to the fluid pressure of the thermosensitive fluid on the outside, which pressure tends to keep the bellows in alinement and prevents distortion of the same when it is subjected to an excess temperature. The flow of cooling medium is between the fixed end of the bellows and the valve, whereby the space between said fixed end and the valve seat remains constant irrespective of the movement of the valve. The bellows may be so charged, as heretofore pointed out, that the valve will open on leakage of the thermostat, reliance being placed on the water pressure to move the valve to open position in the event that the bellows becomes leaky. A leakage hole of suitable size is preferably provided in the valve disk of each of the embodiments.

If desired, the bellows may be associated with the various parts of the valve mechanism so that normally the valve will be open, and when the valve is closed the bellows will be extended; in which case, if a leak should occur in the bellows, the valve will open due to the resiliency of said bellows.

Novel means are also provided for guiding the valve stem and for limiting the expansion and contraction of the corrugated wall or bellows. The device is simple in construction and may be employed to regulate the flow of cooling medium in the cooling system of internal combustion engines without the necessity of modifying the structures thereof. Preferably, the cup constitutes the seat for the valve, but if desired the size of the valve may be varied by providing a seat separate from, but fixedly secured to, the cup.

While the embodiments of the invention illustrated in the drawings have been described with considerable particularity, it is to be expressly understood that the invention is not restricted thereto, as the same is capable of receiving a variety of mechanical expressions, some of which will now readily suggest themselves to those skilled in the art, while changes may be made in the details of construction, arrangement and proportion of parts, and certain features used without other features, without departing from the spirit of the invention. Reference will therefore be had to the appended claims for a definition of the limits of the invention.

What is claimed is:—

1. In a thermostatically controlled valve mechanism for controlling the circulation of cooling medium through the cooling system of an internal combustion engine, the combination of a thermostat comprising an outer cup-shaped wall and an inner flexible tubular wall having one end secured to and forming with said outer wall a chamber for a thermosensitive fluid, valve seat means carried by said cup-shaped wall adjacent the open end thereof, a valve stem secured to the movable end of said flexible wall, and a valve on said stem on the opposite side of said seat from said thermostat, the stationary end of said flexible wall being intermediate said valve and the movable end of said flexible wall.

2. In a thermostatically controlled valve mechanism for controlling the circulation of cooling medium through the cooling system of an internal combustion engine, a thermostat comprising an inner flexible tubular wall, a cup-shaped wall surrounding said flexible wall, the space between said walls constituting a chamber for a thermosensitive fluid, a fixed head for said flexible wall secured to said cup-shaped wall, a movable head secured to said flexible wall, a valve stem secured to said movable head, means associated with said fixed head for guiding said valve stem, a valve on said stem, and valve seat means mounted on said cup-shaped wall and disposed on the opposite side of the fixed head of said flexible wall from said movable head.

3. In a thermostatically controlled valve mechanism for controlling the circulation of cooling medium through the cooling system of an internal combustion engine, a thermostat comprising an outer cup-shaped wall, an inner flexible tubular wall forming therewith a chamber for a thermosensitive fluid, a member fixedly attached to said cup-shaped wall and to one end of said flexible wall, a disk sealing the opposite end of said flexible wall, a hollow stem secured to said disk and projecting beyond the open end of said casing, a valve on said hollow stem, and valve seat means secured to said cup-shaped wall, said hollow stem constituting a filling tube for introducing a thermosensitive fluid into the space between said flexible wall and said cup-shaped wall.

4. In a thermostatically controlled valve mechanism for controlling the circulation of cooling medium through the cooling system of an internal combustion engine, a thermostat having an outer cup-shaped wall, a head secured within said cup-shaped wall at a distance from the open end thereof, a corrugated flexible wall having its outer end secured to said head, a disk closing the opposite inner end of said flexible wall, the space between said flexible and cup-shaped walls constituting a chamber for a thermosensitive fluid, a valve stem extending from said disk outwardly beyond the open end of said cup-shaped wall, a valve on said stem, and valve seat means on said thermostat casing.

5. In a thermostatically controlled valve mechanism for controlling the circulation of cooling medium through the cooling system of an internal combustion engine, a thermostat comprising an outer cup-shaped wall, means constituting a valve seat on said cup-shaped wall, a flexible tubular wall in said cup-shaped wall, the space between said flexible and cup-shaped walls constituting a chamber for a thermosensitive fluid, means for fixedly attaching one end of said flexible wall to said cup-shaped wall, said last named means being spaced from the open end of said cup-shaped wall, and a valve operatively connected to the movable end of said flexible wall and adapted to engage said valve seat means, said cup-shaped wall having openings therein between said attaching means and the open end of said cup-shaped wall for the circulation of the cooling fluid therethrough.

6. In a thermostatically controlled valve mechanism for controlling the circulation of a cooling medium through the cooling system of an internal combustion engine, a thermostat comprising an outer cup-shaped wall about which the cooling medium is adapted to flow and a corrugated flexible wall in said cup-shaped wall, the space between said flexible and cup-shaped walls constituting a chamber for a thermosensitive fluid, a movable valve stem secured to said corrugated wall, a valve on said valve stem, and a seat at the open end of said cup-shaped wall, said cup-shaped wall adjacent its open end being provided with apertures for the passage of cooling medium therethrough.

7. In a device of the class described, a thermostat comprising an outer cup-shaped wall, a flexible tubular wall in said cup-shaped wall, the space between said flexible and cup-shaped walls constituting a chamber for a thermosensitive fluid, means for fixedly securing one end of said flexible wall to said cup-shaped wall, valve seat means on said cup-shaped wall, said cup-shaped wall having openings intermediate the valve seat and the means for attaching said flexible wall to said cup-shaped wall, a valve stem connected to said flexible wall, and a valve on said stem adapted to engage said valve seat means, said valve seat means projecting peripherally with respect to said cup-shaped wall and constituting a mounting means therefor.

8. A self-contained thermostatically controlled valve unit comprising the combination of a thermostat having a movable end wall, a stationary end wall, a flexible tubular wall and an outer cup-shaped wall which extends beyond said stationary end wall and has thereon at its open end a valve seat, said flexible and cup-shaped walls forming between the same a chamber for a thermosensitive fluid, and a valve normally engaging said seat and having a stem extending within said thermostat and operatively connected with said movable end wall, said cup-shaped wall being provided with openings intermediate said stationary end wall and said valve seat.

9. A self-contained thermostatically controlled valve unit including a thermostat comprising a cup-shaped outer wall having a valve seat mounted thereon, a flexible tubular wall in said cup-shaped wall and forming therewith a chamber for a thermosensitive fluid, a movable end wall connected to said flexible wall, a stationary end wall connected to said flexible wall and said cup-shaped wall intermediate said movable end wall and said valve seat, a valve adapted to engage said seat, a valve stem connecting said valve and said movable end wall, and means associated with said stationary end wall for guiding and limiting the movement of said valve stem.

10. In a self-contained thermostatically controlled valve mechanism for controlling the circulation of cooling medium through the cooling system of an internal combustion engine, a thermostat having an outer cup-like wall and an inner flexible wall forming therewith a chamber for a thermosensitive fluid, a valve seat integral with the cup of said thermostat, said cup having openings therein adjacent said valve seat for the passage of fluid flowing around said thermostat, a valve adapted to cooperate with said seat, and a stem connecting said valve with the movable wall of said thermostat.

In testimony whereof I have signed this specification.

WM. F. SEARLE, Jr.